United States Patent [19]
Smets

[11] Patent Number: 6,079,939
[45] Date of Patent: Jun. 27, 2000

[54] PALLET HANDLING APPARATUS

[75] Inventor: John Stephen Smets, Oregon City, Oreg.

[73] Assignee: Smetco, Inc., Aurora, Oreg.

[21] Appl. No.: 09/287,391

[22] Filed: Apr. 6, 1999

[51] Int. Cl.$^7$ .................................................. B65G 47/27
[52] U.S. Cl. ................................... 414/798.5; 414/798.9; 209/942; 209/702; 198/406
[58] Field of Search ........................... 414/798.5, 798.9; 198/406, 407, 409; 209/942, 702, 703, 705

[56] References Cited

U.S. PATENT DOCUMENTS

| | | |
|---|---|---|
| 2,974,812 | 3/1961 | Bopp . |
| 3,098,554 | 7/1963 | Zeligowsky .......................... 198/409 |
| 3,198,310 | 8/1965 | Valentyne ............................. 198/406 |
| 3,521,763 | 7/1970 | Heide et al. . |
| 3,974,921 | 8/1976 | Tokuno . |
| 4,022,332 | 5/1977 | Freakes et al. . |
| 4,037,734 | 7/1977 | Erdman . |
| 4,067,451 | 1/1978 | Winters . |
| 4,103,786 | 8/1978 | Tokuno . |
| 4,178,122 | 12/1979 | Abrahamson . |
| 4,249,847 | 2/1981 | Tokuno . |
| 4,359,304 | 11/1982 | Trudeau ............................... 414/798.9 |
| 4,462,746 | 7/1984 | Smets . |
| 4,664,581 | 5/1987 | Matthews . |
| 4,718,534 | 1/1988 | Harper ................................. 198/409 |
| 4,743,154 | 5/1988 | James et al. . |
| 4,924,999 | 5/1990 | Kikuchi et al. ..................... 198/409 |
| 4,929,147 | 5/1990 | Jenkner ................................ 198/409 |
| 5,360,316 | 11/1994 | O'Mara et al. ..................... 414/798.9 |

FOREIGN PATENT DOCUMENTS 53-22260  3/1978  Japan .

OTHER PUBLICATIONS

SMETCO brochure "Pallet Lay–Down Arm " published prior to 1998.
Statement: Prior Sales Activity with Respect to Application Invention.

*Primary Examiner*—Gregory A. Morse
*Attorney, Agent, or Firm*—Klarquist Sparkman Campbell Leigh & Whinston, LLP

[57] ABSTRACT

Apparatus for handling pallets for inspection and sorting includes an in-feed conveyor mechanism for conveying in index fashion a stack of pallets positioned on edges toward the discharge end of the conveyor whereby the pallets will drop off the discharge end one at a time. A catch plate is provided to catch a pallet as it falls off the end of the in-feed conveyor and permit it to tilt about its lower edge onto an off-bearing conveyor. A retractable cushion arm is provided on the off-bearing conveyor to interrupt the motion of the tilting pallet and lower it gently onto the second conveyor. The exposure of a pallet face at the time it is at the end of the in-feed conveyor permits visual examination of such face, the opposite face being exposed for examination when the pallet tilts onto the off-bearing conveyor. The apparatus enhances the rapidity with which pallets can be handled and reduces necessity for manual handling of pallets.

9 Claims, 2 Drawing Sheets

PALLET HANDLING APPARATUS

FIELD OF THE INVENTION

The invention pertains to an improvement in apparatus for inspecting and sorting used and/or new pallets.

BACKGROUND OF THE INVENTION

Wood pallets used for the storing, shipping and handling of goods are recycled for use but frequently are damaged in use and require repair. U.S. Pat. No. 4,462,746, assigned to the assignee of the subject application, illustrates an apparatus for facilitating the inspection of used pallets and sorting of the inspected pallets for recycling, repair or rejection from further use. That apparatus, while reducing greatly the manual handling of the pallets being cycled, still required manual handling during the inspection process which increased the transit time of pallets through the apparatus and was physically fatiguing.

It is a principal object of the present invention to provide an improved apparatus that reduces the necessity of manual handling of pallets during their inspection and speeds the movement of pallets through the sorting apparatus.

SUMMARY OF THE INVENTION

In the apparatus illustrated in U.S. Pat. No. 4,462,746, a stack of pallets to be inspected and sorted is indexed along a horizontal in-feed conveyor with the pallets standing on one edge. As a pallet reaches the end of the in-feed conveyor, the exposed face of the pallet is observed by an operator to determine its condition. He then manually tilts the pallet onto a following conveyor and observes the opposite face for its condition. The pallet is then sorted with additional equipment for treatment, depending upon its observed condition.

In accordance with the invention, the apparatus is modified in that as a pallet reaches the end of the first conveyor and after a pause sufficient to enable an operator to observe its exposed face, the next index step pushes the pallet off the in-feed conveyor and it drops a few inches onto a cushioned plate. The pallet's forward motion and the inclination of the plate causes the upper portion of the pallet to tilt forward, the cushioned plate serving as a fulcrum. The pallet is permitted to rotate onto a cushion arm which engages the pallet when it is at an angle of about thirty degrees to the horizontal, exposing the opposite fae of the pallet for inspection by the operator. The cushion are is automatically retracted after sensing of the pallet striking the cushion arm, allowing the pallet to lower onto an off-bearing conveyor. Depending upon the observed condition of the pallet, the operator signals through controls the off-bearing conveyor and subsequent sorting conveyors to deliver the pallet to the desired location for futher handling. The subject invention permits pallets to be inspected at a faster rate and with less stress imposed upon the operator.

DETAILED DESCRIPTION

Figure 1:
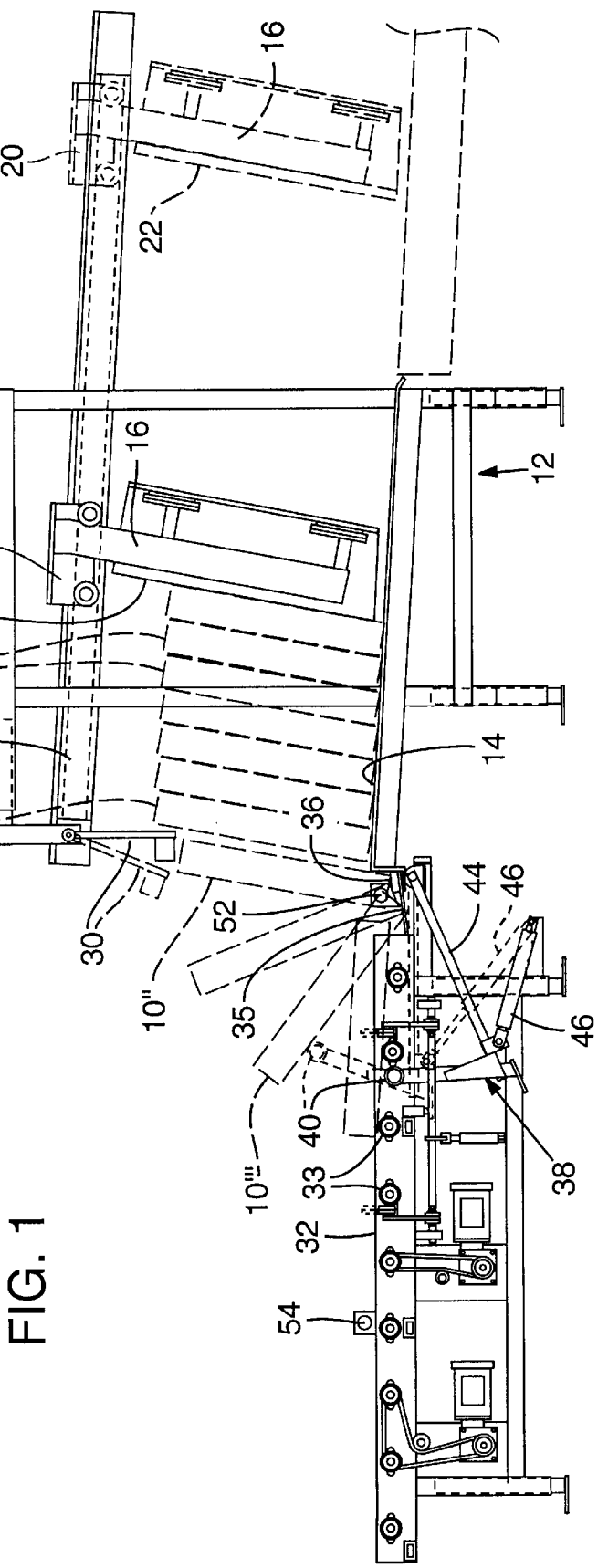
FIG. 1 is a side elevation of a portion of sorting apparatus incorporating the invention.

Refeing first to FIG. 1, pallets 10 to be sorted are stacked on edge upon an in-feed conveyor 12, the bed 14 of which is generally horizontal but is preferably inclined slightly upwardly at a small acute angle of between about two to three degrees in the direction of movement of the pallets so that the pallets will tilt back slightly, as shown FIG. 1. The pallets may be indexed along the bed by any suitable mechanism, the illustrated apparatus comprising a pair of pusher arms 16 suspended one from each of a pair of overhead tracks 18, the arms being suspended from trolleys 20, one on each track, adapted to be indexed along the tracks by suitable drive mechanism (not shown). The arms 16 are each provided with a face plate 22, the face plates 22 being inclined a small acute angle to a perpendicular to tha surface of the in-feed conveyor and away from the discharge end so that the pallets in a stack supported along the conveyor 12 will lean backwardly, as shown, whereby the foremost pallet 10 in a stack on the conveyor will not tilt forwardly upon the conveyor bed. Pallets have standardized dimensions being about 48" in length in the direction of the stringers, about 40" in width in the direction of the face boards and 5" to 5½" in height.

Pivotally suspended from a cross bar extending between the tracks 18 and above the discharge end of the in-feed conveyor 12 is a free-swinging pallet restraining arm 30, carrying a counter weight and positioned so as to engage the exposed face of an end pallet 10' when such pallet reaches the discharge end of the in-feed conveyor bed 14 to prevent accidental forward tilting of an end pallet 10'.

Figure 2:
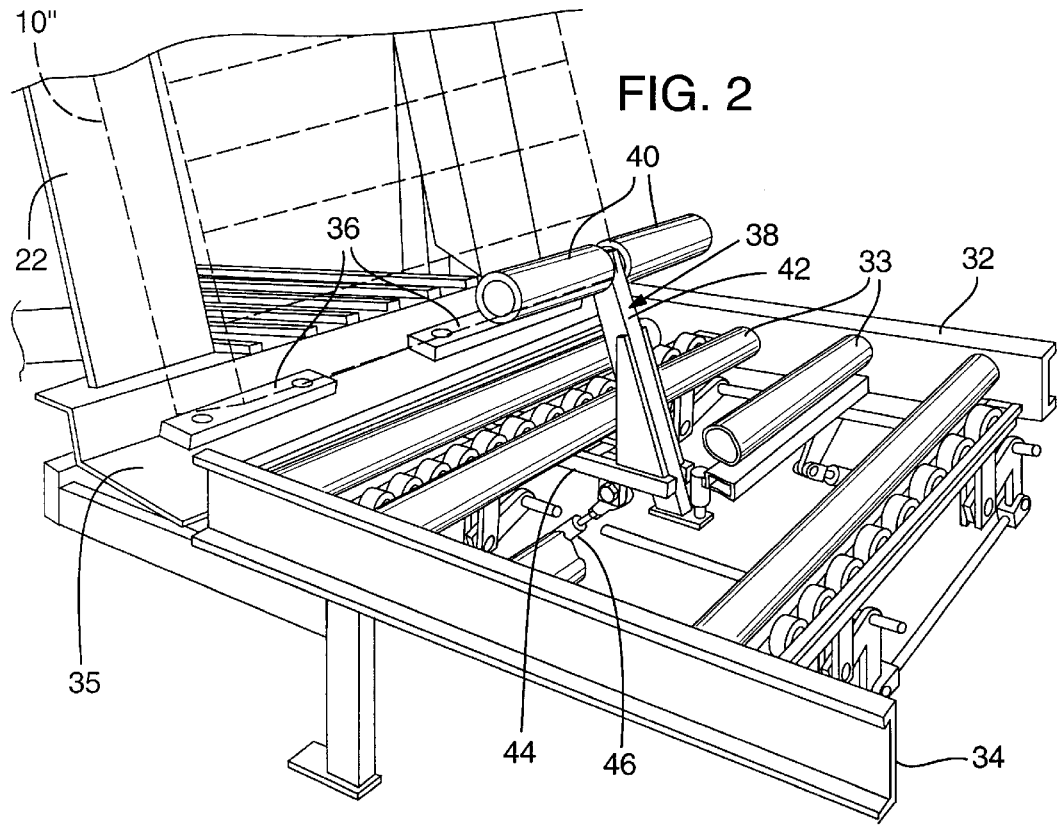
FIG. 2 is an enlarged, fragmentary, perspective view of the portion of the apparatus where the pallet is tilted onto the off-bearing conveyor.
Figure 3:
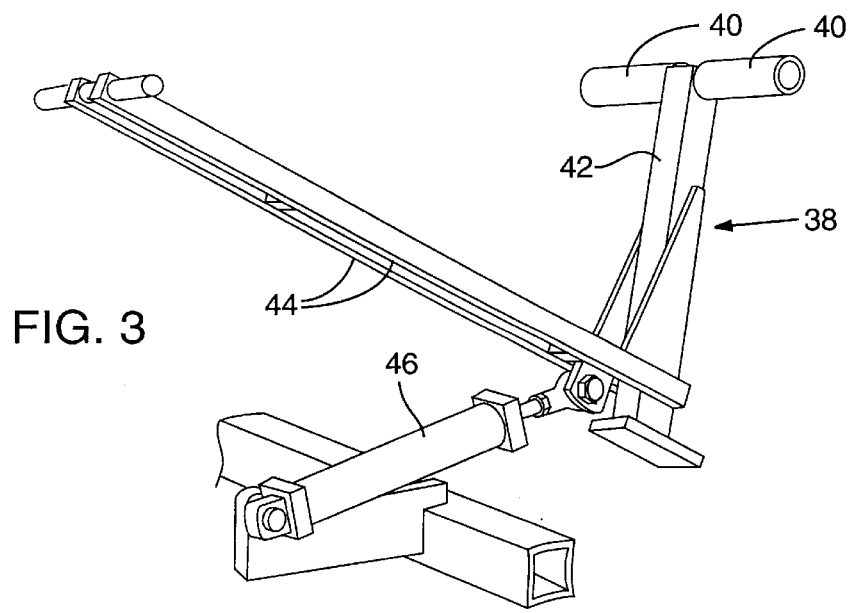
FIG. 3 is a fragmentary, perspective view of the cushion arm and the raising and lowering mechanism therefor.

Positioned in line with the in-feed conveyor 12 is an off-bearing conveyor 32 which preferably comprises live rollers 33 defining a substantially horizontal plane for carrying off pallets placed therein for sorting of pallets of like grade with apparatus such as shown in U.S. Pat. No. 4,462,746 for further processing. The conveyor 32 comprises a bed frame 34 spaced about ten inches from the bed 14 of the conveyor 12 so that when an end pallet 10' is pushed off the bed 14 it may fall freely between the conveyors 12–32, as indicated by the pallet 10". As best shown in FIG. 2, positioned between the adjacent ends of the conveyors 12, 32 is a catch plate 35 having a pair of cushion bars 36, of rubber or similar resilient material, mounted thereon and upon which the pallet 10" may land without injury and a minimum of noise as it slides off the conveyor 12. The restraining arm 30 is of such length the pallet 10", when it lands upon the bars 36, will be entirely beneath the lower end of the arm. Because of the forward momentum impacted to the discharging pallet 10" and the inclination of the cushion bars 36, as it lands upon the cushion bars 36 the pallet will tend to tilt forwardly toward the off-bearing conveyor 32. To minimize injury to the pallet and to reduce noise, the off-bearing conveyor 32 is provided with a cushion arm 38 adapted to extend above the bed of the conveyor so as to engage the tilting pallet, indicated at 10''', when it is at an angle of about 30° to the horizontal, as shown in phantom in FIG. 1. The cushion ann 38 is provided with a pair of cushion bars 40 extending horizontally from a support arm 42 that in turn is mnounted between a pair of spaced apart pivot arms 44 that are pivotally mounted to the bed of the off-bearing conveyor 32 adjacent its in-feed end. The pivot arms are pivoted about their mounting axis by a pneumatic cylinder 46 from which air can be bled to lower the cushion bars 40 and the supported pallet 10''' at a rate to avoid noise and injury to the pallet and the conveyor 32 as the pallet comes into contact with the live rollers 33 of the off-bearing conveyor.

The catch plate 35 and the upper surfaces of the cushion bars 36 preferably are inclined downwardly from the in-feed conveyor 12 at an angle of about ten degrees to the horizontal.

An operator stationed adjacent the adjacent ends of the conveyors 12, 32 can first observe the exposed face of the end pallet 10' on the conveyor 12, and as such pallet falls forward onto the cushion arm 38 and is lowered onto the off-bearing conveyor 32 can observe the other, now upper, face of the pallet. By means of any suitable signaling system, the operator can direct the operation downstream of his inspection station so that the pallet is directed to a desired location for further processing.

Any of many available detecting and signaling systems can be used to obtain automatic indexing of the in-hfeed conveyoi 12 and raising and lowering of the cushion arm 38. In the illustrated embodiment, a photoelectric eye detector, indicated at 52 is positioned between the conveyors 12, 14 so that as a pallet falls between the conveyors onto the cushion blocks 36, the movement of the trolleys 20 is arrested so only the end most pallet is off-loaded. The lowering of the cushion arm 38 may be effected by means of a known reed switch positioned on the cylinder 46 and which operates upon the movement of a magnet positioned on the piston of such cylinder. When the piston moves slightly upon the impact of the pallet 10''' falling on the cushion arm, the reed switch operates causing air to be bled from the cylinder 46. Photoelectric eye 54 is also positioned downstream of the off-bearing conveyor 32 to trigger another indexing movement of the in-feed conveyor and raising of the cushion arm 38 as an inspected pallet clears the cushion arm and interrupts the eye 54.

Apparatus in accordance with the invention enables the inspection rate of pallets to be increased to between 15 to 20 pallets per minute as compared to about 10 to 12 pallets per minute when pallets are tipped manually from a feed stack onto an off-bearing conveyor, and substantially reduces the need for manually handling the pallets, thus reducing operator fatigue.

Having described and illustrated a preferred embodiment of the invention, it will be apparent to those skilled in the art the invention permits of modification in arrangement and detail. I claim all such modifications as came with in the scope of the appended claims.

I claim:

1. An apparatus for handling and sorting rectangular pallets, of predetermined length, width and height comprising a generally horizontal first conveyor for supporting a stack of pallets in a generally horizontal position, said pallets each being generally vertically oriented, said first conveyor having a discharge end, means for indexing said stack toward said discharge end in steps substantially equal to said pallet height, a second conveyor having an in-feed end positioned a predetermined distance greater than said pallet height from said first conveyor discharge end and having a pallet supporting bed defining a substantially horizontal plane, a catch plate positioned between said first conveyor discharge end and said second conveyor in-feed end for receiving a pallet from said first conveyor as it is indexed off said discharge end, and on which plate a pallet may tilt about its lowermost edge onto said second conveyor, said second conveyor having means for conveying a pallet positioned on said in-feed end thereof away from said in-feed end.

2. The apparatus of claim 1 having a cushion arm operatively mounted on said second conveyor for extension above said plane and for retraction to position it below said plane, said cushion arm being positioned less than said pallet width from said in-feed end of said second conveyor and adapted to engage a pallet tilting from said catch plate onto said second conveyor, and means operatively connected to said cushion arm for raising and lowering said cushion arm.

3. The apparartus of claim 1 wherein said in-feed conveyor has a pallet stack supporting surface inclined upwardly at a small acute angle from the horizontal toward said discharge end.

4. The apparatus of claim 1 wherein at least one pallet restraining arm is pivotally mounted above said in-feed conveyor discharge end in position to engage the top portion of a pallet adjacent said discharge end to restrain said adjacent pallet from tilting forwardly about its lower edge.

5. The apparatus of claim 2 wherein said means for indexing said stack comprises a pair of tracks positioned above said in-feed conveyor, trolleys operatively supported one on each of said tracks, and a pair of pusher arms supported one on each of said trolleys, said pusher arms having face plates defining a plane inclined at a small acute angle from a perpendicular to said pallet supporting surface in a direction upwardly and away from said conveyor discharge end.

6. The apparatus of claim 3 including first detecting means mounted on said second conveyor for detecting the passage of a pallet on said second conveyor away from said in-feed end thereof and for generating a signal to effect operation of said stack indexing means to initiate movement of a pallet stack on said in-feed conveyor toward said in-feed conveyor discharge end, and to effect operation of said cushion arm raising and lowering means to raise said cushion arm.

7. The apparatus of claim 1 including second detecting means to detect a discharge of a pallet from said first conveyor discharge end onto said catch plate and generating a signal to stop said stack indexing means.

8. Apparatus as set forth in claim 1 wherein said catch plate slopes downwardly from said first conveyor discharge end.

9. Apparatus as set forth in claim 1 wherein said catch plate slopes downwardly at an angle of about ten degrees to the horizontal.

* * * * *